United States Patent [19]

Ishikawa et al.

[11] Patent Number: 5,617,171
[45] Date of Patent: Apr. 1, 1997

[54] PHOTOGRAPHIC PROCESSING METHOD

[75] Inventors: Masazumi Ishikawa; Toru Tanibata, both of Wakayama, Japan

[73] Assignee: Noritsu Koki Co., Ltd., Wakayama, Japan

[21] Appl. No.: 658,387

[22] Filed: Jun. 5, 1996

Related U.S. Application Data

[63] Continuation of Ser. No. 213,064, Mar. 15, 1994, abandoned.

[30] Foreign Application Priority Data

Apr. 2, 1993 [JP] Japan ................................. 5-076879

[51] Int. Cl.$^6$ .................................................. G03B 17/26
[52] U.S. Cl. ............................ 396/512; 355/40; 206/455; 396/661; 396/564
[58] Field of Search ........................... 354/120, 275, 354/319, 297, 354; 355/40, 41, 54, 64, 72, 68, 95; 206/232, 383, 225, 408, 450, 455, 472, 475, 389, 391; 40/152, 156, 159, 124, 157; 358/302, 512, 524, 528; 242/587; 209/565

[56] References Cited

U.S. PATENT DOCUMENTS

| | | | |
|---|---|---|---|
| 4,186,837 | 2/1980 | Popiel et al. | 209/565 |
| 4,720,733 | 1/1988 | Ohtake et al. | 355/64 X |
| 4,903,068 | 2/1990 | Shiota | 355/68 X |
| 4,966,285 | 10/1990 | Ohtake et al. | 206/455 |
| 5,031,773 | 7/1991 | Manico et al. | 206/455 |
| 5,083,155 | 1/1992 | Kataoka et al. | 354/275 X |
| 5,184,227 | 2/1993 | Foley | 354/120 |
| 5,212,512 | 5/1993 | Shiota | 354/319 |
| 5,271,497 | 12/1993 | Blackman et al. | 206/232 |
| 5,333,033 | 7/1994 | Blackman | 354/275 X |
| 5,381,202 | 1/1995 | Mizuno et al. | 354/275 |

*Primary Examiner*—D. Rutledge
*Attorney, Agent, or Firm*—Armstrong, Westerman, Hattori, McLeland & Naughton

[57] ABSTRACT

A photographic processing method is provided which avoids folding of a film during storage without a problem of bulkiness in the storage and allows easy identification of images of the film, and which includes the steps of: winding a film finished with printing into a cartridge; and providing an index print representing a content of the film to the cartridge.

2 Claims, 4 Drawing Sheets

PHOTOGRAPHIC PROCESSING METHOD

This application is a continuation of application Ser. No. 08/213,064, filed Mar. 15, 1994, now abandoned.

BACKGROUND OF THE INVENTION

The present invention relates to photographic processing methods and, more particularly, to a photographic processing method which allows one to tell the content of a developed film wound into a cartridge at a glance.

It is a conventional practice to cut a developed film into several pieces to store it within a pouch of translucent film (hereinafter referred to as "film sheet"). If a multiplicity of films are to be stored, many film sheets are needed therefor, which results in problems that the film sheets become significantly bulky and resources are wastefully used therefor. There is another problem that images of a film in such a film sheet are hard to identify and, hence, each piece of the film must be taken out from the film sheet and held directly to the light for its identification. In this case, care should be taken so as not to fold the negative film or leave a fingerprint thereon.

Also on the part of the dealers concerned, in case that a developed film accommodated in a film sheet is returned to a customer, time and labor are needed to cut the film, and if the film is to be extra-printed, troublesome operations would be further needed therefor due to the film cut into several pieces. Furthermore, a used cartridge of the film must be disposed of.

In view of the foregoing circumstances, it is an object of the present invention to provide a photographic processing method which is capable of storing films in a non-bulking fashion, avoiding the films from being folded during storage and allowing one to know the content of each film with ease.

SUMMARY OF THE INVENTION

In accordance with the present invention, there is provided a photographic processing method comprising the steps of: winding a film finished with printing into a cartridge; and providing an index print representing a content of the film to the cartridge.

Preferably, the index print is affixed to the cartridge or directly printed thereon.

In the photographic processing method of the present invention, a film once developed is wound into a cartridge for its storage, and an index print corresponding to the film is provided to the cartridge.

DETAILED DESCRIPTION

A photographic processing method according to the present invention will now be described with reference to the attached drawings.

Figure 1:
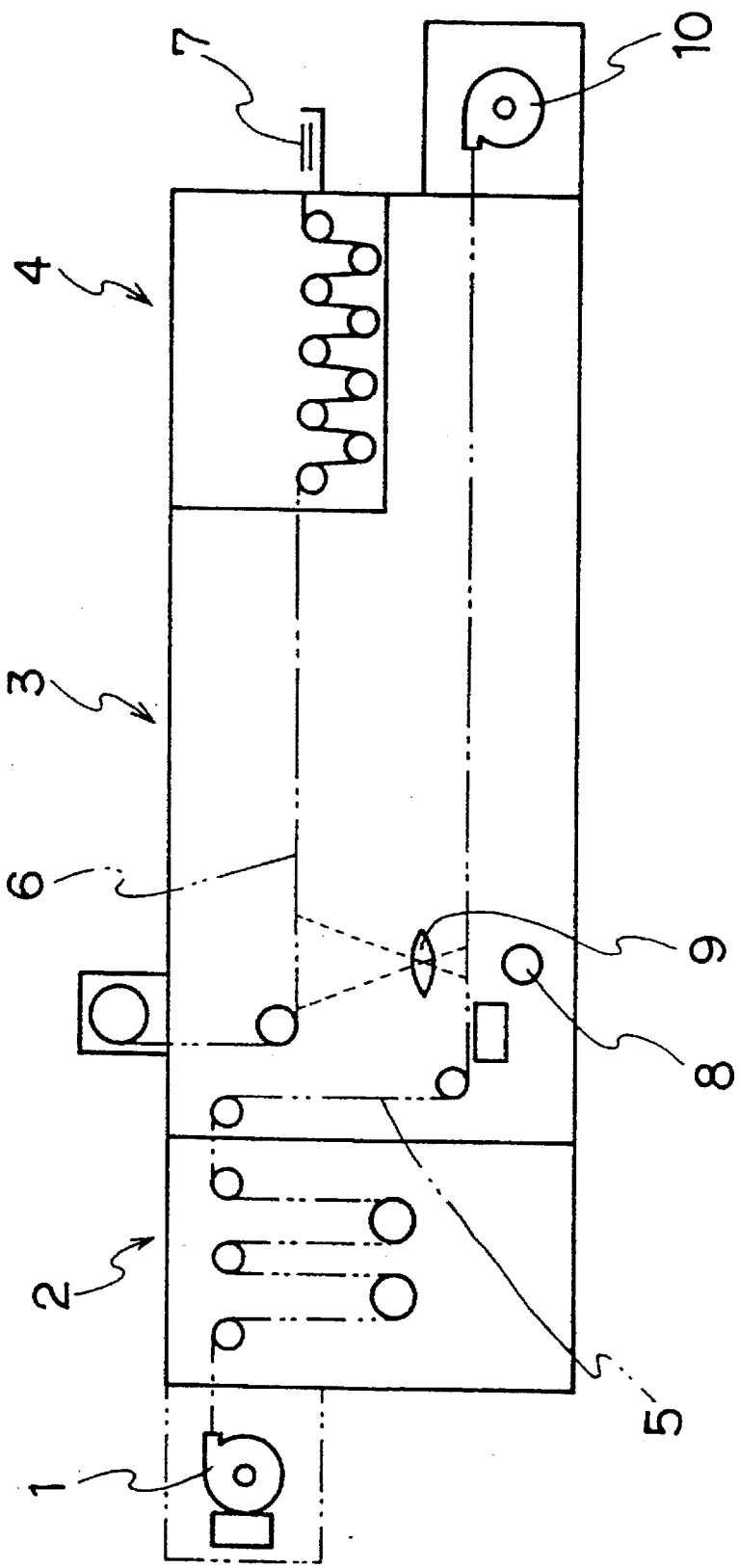
FIG. 1 is a schematic explanatory view of a photographic processing method according to the present invention.

Referring to FIG. 1, denoted by numeral 2 is a film developing part, by numeral 3 an exposure part, and by numeral 4 a photographic paper developing part, each of which can employ a conventionally used arrangement.

First, a film 5 having been photographed and accommodated in a cartridge 1 is set in a predetermined position of a photographic processing apparatus. The film 5 drawn out of the cartridge 1 is subjected to film development, printing and photographic paper development according to a common procedure. In FIG. 1 numerals 8, 9 and 6 denote a light source, a lens and a photographic paper, respectively. The photographic paper 6 which has been developed after printing is separated into prints 7 each having an image on a frame basis by means of an appropriate cutting means (not shown), then ejected from the photographic processing apparatus. On the other hand, the film 5 thus printed is wound into a cartridge 10. The cartridge 10 is preferably the one which has been previously set in the position and from which the film has been drawn out. Nevertheless, it might be another cartridge.

Figure 2:
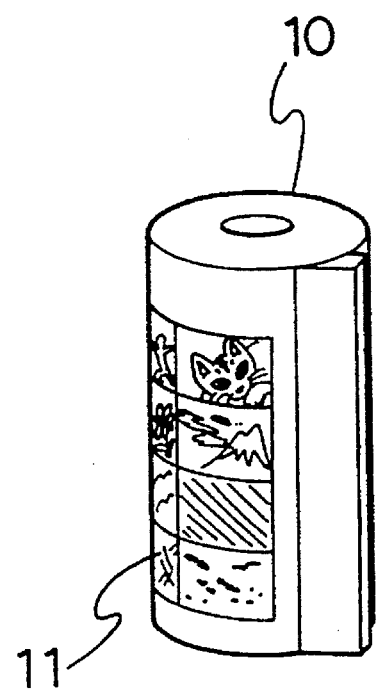
FIG. 2 is an explanatory view of a cartridge for use in the present invention.

While printing is carried out, an index print 11 is also made. The index print 11 is then affixed to the cartridge 10 in which the film 5 has been wound shown in FIG. 2. The index print 11 is a print on which images of the film are arranged in the order of frame. Each image on the index print 11 is sometimes numbered with the corresponding frame number. The affixation of the index print 11 to the cartridge is achieved by the use of a double sided adhesive tape or an adhesive.

The index print might be in the form of a thermal dye sublimation transfer print or ink jet print obtained by scanning the images of the film, not as well as in the form of a photographic print. The index print might be directly printed on the cartridge by non-impact printing method such as ink jet method.

Since the index print is thus affixed to the cartridge accommodating the film finished with printing, there can be omitted time and labor for cutting the film and putting it into a film sheet, while the content of the film is easily identified from the index print.

It should be noted that the index print might be adapted to represent images of only several frames of the film instead of images of all the frames thereof.

Figure 3:
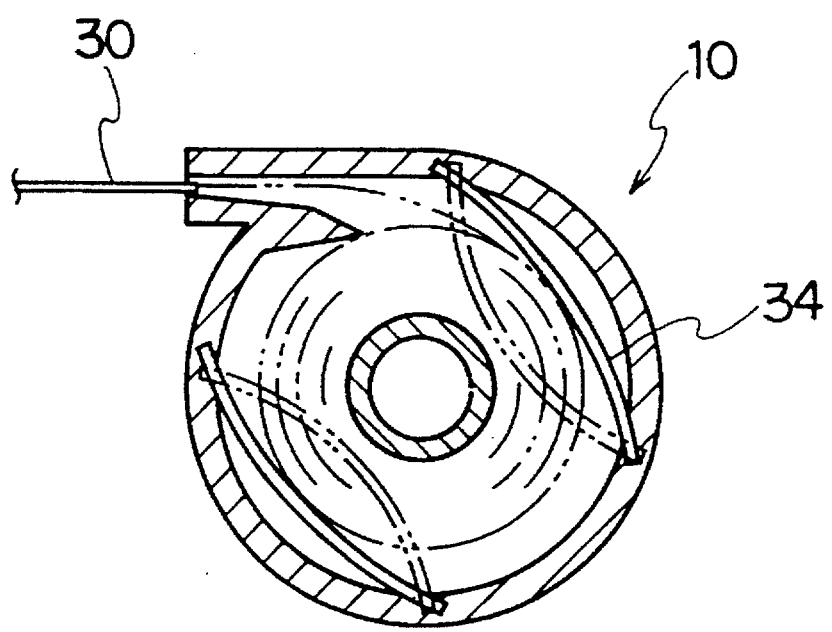
FIG. 3 is an explanatory section of the cartridge for showing the internal structure thereof.
Figure 4:
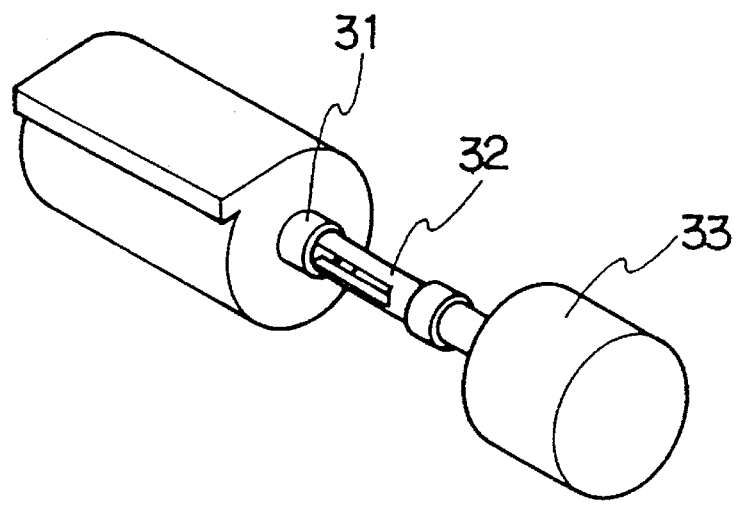
FIG. 4 is an explanatory view showing the relationship between the cartridge and a motor.
Figure 5:
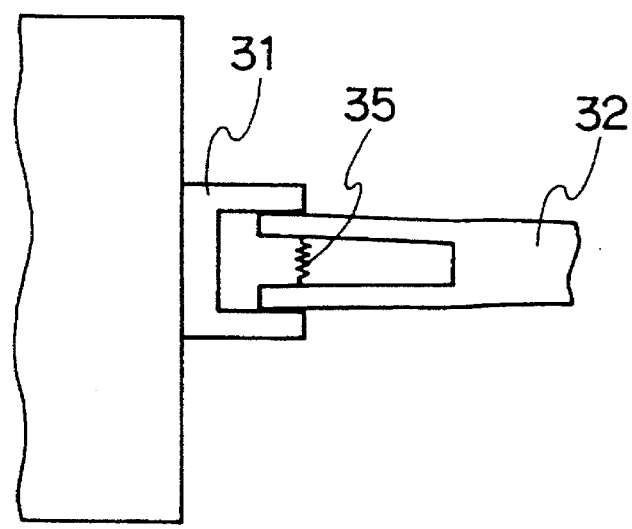
FIG. 5 is an explanatory view showing a spool connected to a coupling.

The film finished with printing is wound into the cartridge in the following manner as shown in FIGS. 3 to 5.

FIG. 3 is an explanatory section of the cartridge for showing the internal structure thereof. The film having been developed and printed is conveyed along a conveyer guide (not shown) and led into the cartridge 10 along a film guide 30 disposed adjacent an inlet of the cartridge 10.

When the leading end of the film enters the cartridge 10, a motor 33 connected to a spool 31 of the cartridge 10 through a coupling 32 is actuated to rotate the spool 31 for winding the film. In this case, a plate spring 34 serves to urge the film against the spool 31, so that the film is assuredly wound by the rotation of the spool 31. Note that in FIG. 3 the plate spring 34 when in a condition where the film is absent in the cartridge 10 is drawn in chain double-dashed line. As can be seen from FIG. 3, the plate spring 34 is disposed so as to press the film against the spool 31. As shown in FIG. 5, the coupling 32 forks into two branches toward the cartridge 10, and a spring 35 is provided between the two branches to urge them in such a direction as to enlarge the space therebetween. This urging force of the spring 35 permits the coupling 32 to connect to the spool 31 and, hence, the rotating force of the motor 33 can be transmitted to the spool 31.

As has been described, according to the photographic processing method of the present invention, a film having been finished with printing is wound into a cartridge and an index print corresponding to the film is affixed to the cartridge. Hence, the film can be stored without the problem of bulkiness, the content of the film accommodated in the cartridge can be identified with ease, and there is no need to take care not to damage the film. In addition, since the cartridge can be reused while a film sheet is dispensable, the present invention avoids wasteful use of resources, thus enjoying ecological merits.

While only certain presently preferred embodiments have been described in detail, as will be apparent with those familiar with the art, certain changes and modifications can be made without departing from the spirit and scope of the invention as defined by the following claims.

What is claimed is:

1. A photographic processing method comprising the steps of: providing a cartridge containing exposed film, drawing the exposed film from the cartridge, subjecting the film to film development, making an index print from the developed film, the index print representing images from the developed film, winding the developed film into a cartridge; and affixing the index print to the cartridge containing the developed film.

2. A photographic processing method comprising the steps of: providing a cartridgee containing exposed film, drawing the exposed film from the cartridge, subjecting the film to film development, scanning images of the developed film to obtain data for an index print representing images on the developed film, winding the developed film into a cartridge; and directly printing the data to form an index print to the cartridge containing the developed film.

* * * * *